(12) United States Patent
Ishida

(10) Patent No.: US 8,567,789 B2
(45) Date of Patent: Oct. 29, 2013

(54) SEALING DEVICE

(75) Inventor: Koki Ishida, Okayama (JP)

(73) Assignee: Uchiyama Manufacturing Corp., Okayama-shi, Okayama (JP)

( * ) Notice: Subject to any disclaimer, the term of this patent is extended or adjusted under 35 U.S.C. 154(b) by 184 days.

(21) Appl. No.: 12/461,549

(22) Filed: Aug. 14, 2009

(65) Prior Publication Data

US 2010/0052262 A1   Mar. 4, 2010

(30) Foreign Application Priority Data

Aug. 29, 2008  (JP) ................................ 2008-222322
May 7, 2009    (JP) ................................ 2009-112508

(51) Int. Cl.
   *F16J 15/32*           (2006.01)
(52) U.S. Cl.
   USPC ......................................... 277/559; 277/571
(58) Field of Classification Search
   USPC .......................... 277/549, 559, 571
   See application file for complete search history.

(56) References Cited

U.S. PATENT DOCUMENTS

| | | | | |
|---|---|---|---|---|
| 6,637,754 | B1 * | 10/2003 | Ohtsuki et al. | 277/549 |
| 6,979,001 | B2 * | 12/2005 | Ohtsuki et al. | 277/549 |
| 2004/0017301 | A1 * | 1/2004 | Mizuta | 341/15 |

FOREIGN PATENT DOCUMENTS

| | | | |
|---|---|---|---|
| EP | 1830086 A1 * | 9/2007 | |
| JP | 3-43174 | 4/1991 | |
| JP | 2003-148626 | 5/2003 | |
| WO | WO 2006064908 A1 * | 6/2006 | |

* cited by examiner

*Primary Examiner* — Vishal Patel
(74) *Attorney, Agent, or Firm* — Bacon & Thomas, PLLC

(57) ABSTRACT

A sealing device for sealing space between two members concentrically and relatively rotating comprising a core member fixedly fitted into one of the two members, a metal slinger fixedly fitted into the other of the two members, and an elastic seal member fixedly attached to the core member and having a seal lip which elastically and slidably contacts the slinger. The slinger has a slidably contacting treated surface for the seal lip as is processed such a surface-treatment as defined by the following parameters: arithmetic mean roughness Ra in the range from 0.5 µm to 1.5 µm, root-mean-square roughness Rq in the range from 0.6 µm to 2.0 µm, mean surface irregularity interval Sm in the range from 0.05 mm to 0.17 mm and peak count Pc (50%) in the range from 20 to 60.

4 Claims, 7 Drawing Sheets

| | sample A | sample B | sample C | sample D | sample E | sample F | Sample G | sample H |
|---|---|---|---|---|---|---|---|---|
| surface treatment | none | cutting work | concave-convex transfer | shot peening | shot peening | shot peening | shot peening | shot peening |
| Ra (μm) | 0.10 | 0.85 | 0.79 | 0.52 | 0.51 | 0.68 | 0.71 | 1.12 |
| Rq (μm) | 0.13 | 1.15 | 1.06 | 0.66 | 0.66 | 0.86 | 0.91 | 1.42 |
| Sm (mm) | 0.140 | 0.160 | 0.140 | 0.080 | 0.075 | 0.090 | 0.120 | 0.150 |
| Pc (50%) | 12 | 22 | 25 | 43 | 43 | 39 | 37 | 29 |
| difference(%) (−3σ to +3σ) | −132.5% ~ +136.4% | −51.5% ~ +62.9% | −12.1% ~ +14.6% | | −6.1% ~ +5.6% | | | |
| torque reduction rate (%) | 0 | −13 | −32 | −27 | −35 | −43 | −49 | −55 |
| heat generation temperature reduction rate (%) | 0 | −11 | −37 | −30 | −27 | −42 | −38 | −53 |

Fig.5

SEALING DEVICE

TECHNICAL FIELD

The present invention relates to a sealing device comprising a core member fixedly fitted into one of two members rotating relatively and concentrically, a metal slinger fixedly fitted into the other of the two members, and an elastic seal member provided with a seal lip elastically and slidably contacting with the slinger and fixedly attached to the core member, thereby sealing a space between the two members.

BACKGROUND ART

A sealing device has been well known which is interposed between a stationary side member such as a bearing unit and a rotary side member in order to prevent water and dust from entering in the wheel suspension of vehicle wheels. Several measures have been recently taken so as to realize fuel efficient vehicles and the reduction of rotary torque is sought for the bearing unit. A seal lip is provided so as to elastically and slidably contact a slinger fixedly fitted to the rotary side member of the sealing device. If the force of seal lip elastically and slidably contacting the slinger is made large, it is point out the friction of the slinger and the seal lip is increased to exert influence on the rotary torque and to inhibit low torque.

According to some prior arts, the slidably contacting face of the slinger with the seal lip is processed to reduce the friction with the seal lip so as to reduce the torque.

FIG. 7a and FIG. 7b diagrammatically show a partially enlarged sectional view of the prior art, namely a partially enlarged view of the slidably contacting face of the slinger and the seal lip. The reference numeral 70 in the figure shows a slinger fixedly fitted to the rotary side member and constituting a sealing device, 730 shows the slidably contacting face of the slinger and 750 shows an adhesive layer made of adhesive agent.

There are several ways for surface processing of the slidably contacting face 730 of the slinger 70. When edges are formed concave and convex by roughening the slidably contacting face 730 as shown in FIG. 7a, there arises such a problem that the slidably contacting seal lip is worn away.

When a tone wheel made of magnetic rubber is provided on the outer face of the slinger 70 and constitutes a magnetic encoder together with a magnetic sensor, the tone wheel is integrally attached to the slinger 70 with adhesive. In case of bonding, the tone wheel is attached after the slinger 70 is entirely soaked in adhesive, so that an adhesive layer 750 is formed on the slidably contacting face 730 even if the roughening process is executed on the slidably contacting face 730 as shown in FIG. 7b, thereby deteriorating the reduction effect of the rotary torque.

Japanese Patent Publication 2003-148626-A (Patent Citation 1) describes that the slidably contacting face of the slinger with the seal lip has a predetermined surface roughness, wherein concavity and convexity are transferred on the surface of the slinger when the slinger is rolled with a roll executed with concavo-concave treatment and the surface of the slinger is processed to be a predetermined surface roughness.

The Japanese Utility Model Publication 1991-43174-U1 (Patent Citation 2) discloses that the slidably contacting face of a slinger with a seal lip is processed in order to improve the sealing ability.

The patent citation 2 describes spherical objects having an appropriate grain size are shot on the slidably contacting face to obtain predetermined surface roughness.

DISCLOSURE OF INVENTION

Problems to be Solved in the Invention

However, according to the above-mentioned patent citation 1 in which the surface treatment is executed using the roller with concavo-concave treatment, the concavity and convexity on the roll surface are worn out when the roller transfer is repeated. Therefore, it is difficult to transfer a constant surface roughness on the slidably contacting face of the slinger for a long time.

According to the blast treatment described in the patent citation 2, the surface is made rough by shooting the spherical objects, so that it can prevent abrasion of the seal lip in that the concavity and convexity without having edges can be formed.

However, depending on the degree of roughness of the slidably contacting face, the abrasion of the seal lip is accelerated or the sealing ability as the sealing device may be affected adversely. In addition, it is known that the reduction effect of the rotary torque may not be shown.

The present invention is proposed in order to solve the above-mentioned problems and it provides a sealing device which can reduce the rotary torque and the heat generation temperature of the seal lip.

Means to Solve Problems

According to the sealing device of the present invention proposed to solve the above-mentioned problems, the sealing device for sealing space between two members concentrically and relatively rotating comprises a core member fixedly fitted into one of the two members, a metal slinger fixedly fitted into the other of the two members, and an elastic seal member fixedly attached to the core member and having a seal lip which elastically and slidably contacts the slinger. The slinger has a slidably contacting treated surface for the seal lip as is processed such a surface-treatment as defined by the following parameters: arithmetic mean roughness Ra in the range from 0.5 μm to 1.5 μm, root-mean-square roughness Rq in the range from 0.6 μm to 2.0 μm, mean surface irregularity interval Sm in the range from 0.05 mm to 0.17 mm and peak count Pc (50%) in the range from 20 to 60.

In the above-mentioned invention, the slidably contacting treated surface is a surface as defined by that the error between the value A calculated by the following mathematical expression (1) and the measured value of the value Ra meets the following condition (1), $$A = 0.8642 Rq - 0.5078 Sm - 0.0012 Pc + 0.05 \quad \text{Mathematical expression (1)}$$

Condition (1):

Herein as for the error between the calculated value A and the measured value of (A−Ra)/Ra×100(%), the distribution of the error obtained by measuring in random directions is within ±7%, when statistically viewing 3σ.

Further in the present invention, the one member is a stationary side member, the other member is a rotary side member, the slinger comprises a fitting cylindrical portion to be fitted into the rotary side member and a brim portion extended in radial direction of the slinger from an end of the outer side relative to a part of the fitting cylindrical portion to be sealed, and a tone wheel magnetized by a plurality of N poles and S poles is integrally attached to an opposite side of the slidably contacting treated surface, in such manner that N pole and S pole are alternately formed along its circumferential direction, and the slidably contacting treated surface of the slinger is formed by being processed the surface-treatment in claim 1, after the tone wheel is attached to the opposite side of the slidably contacting treated surface.

Still further according to the present invention, the one member is a stationary side member and the other is a rotary side member, the slinger comprises a fitting cylindrical portion to be fitted into the rotary side member and a brim portion extended in radial direction of the slinger from an end of the outer side relative to a part of the fitting cylindrical portion to be sealed, a tone wheel magnetized by a plurality of N poles and S poles is integrally attached to an opposite side of the slidably contacting treated surface, in such manner that N pole and S pole are alternately formed along its circumferential direction, and the slidably contacting treated surface of the slinger is processed by being treated the surface-treatment in claim 1, after adhesive is applied on the whole surface of the slinger, and other surface except the slidably contacting treated surface is masked, then such masking is removed, thereafter the tone wheel is integrally attached to the slinger.

Effect of the Invention

According to the sealing device of the present invention, the slidably contacting treated surface of the slinger for the seal lip is processed such that the arithmetic mean roughness Ra is 0.5 μm to 1.5 μm, the root-mean-square roughness Rq is 0.6 μm to 2.0 μm, the mean irregularity interval Sm is 0.05 mm to 0.17 mm and the peak count Pc (50%) is 20 to 60, thereby enabling to form an uneven surface with small rough pitch and without edges. Therefore, the friction resistance of the slidably contacting treated surface can be reduced and the rotary torque can be reduced while keeping sealing ability. Further, the heat generation temperature of the seal lip can be also reduced, thereby realizing long life sealing members. Still further, if the sealing device of the present invention is applied to the bearing unit of vehicle, the fuel-efficiency can be achieved.

The above-mentioned predetermined parameters are obtained by the inventors after many trials and experiments executing surface treatment using various parameters. The parameters are to achieve remarkable reduction of rotary torque without disturbing the sealing ability, unlike those for simply executing surface treatment.

When the value becomes smaller than the above-mentioned predetermined parameter, the friction force of the slinger and the seal lip tends to become larger and the reduction effect of the rotary torque is not expected.

When the value becomes larger than the above-mentioned predetermined parameter, the reduction effect of the rotary torque gradually becomes saturated and adverse effect to the sealing ability tends to be shown.

BRIEF DESCRIPTION OF DRAWINGS

FIG. 5 shows a table of the experimental result such as measured value, calculated value and reduction rate according to experiments.

BEST MODE FOR CARRYING OUT THE INVENTION

Figure 1:
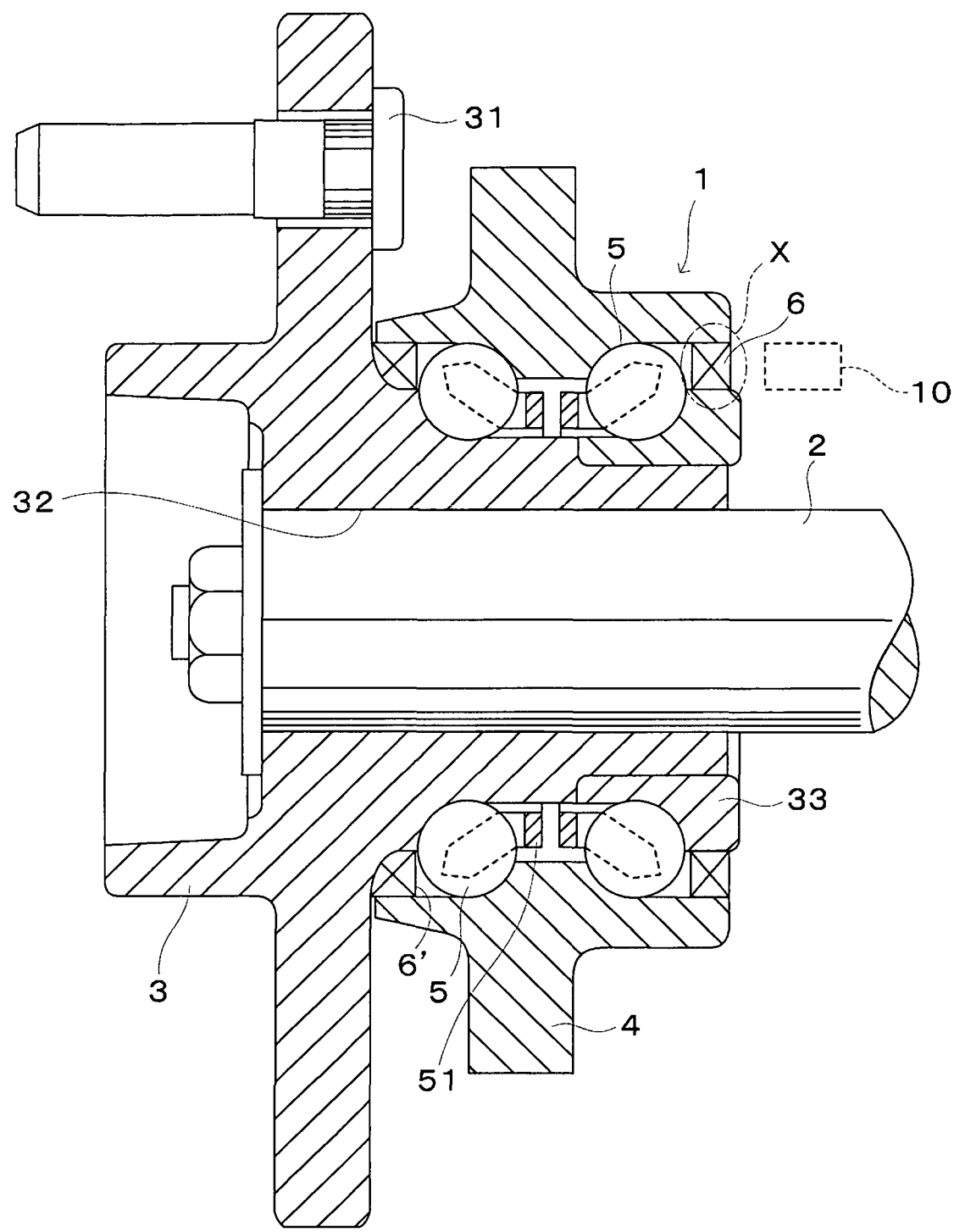
FIG. 1 is a longitudinal sectional view showing one embodiment in which the sealing device of the present invention is employed.

The embodiment of the present invention is explained referring to the drawings.

Figure 2:
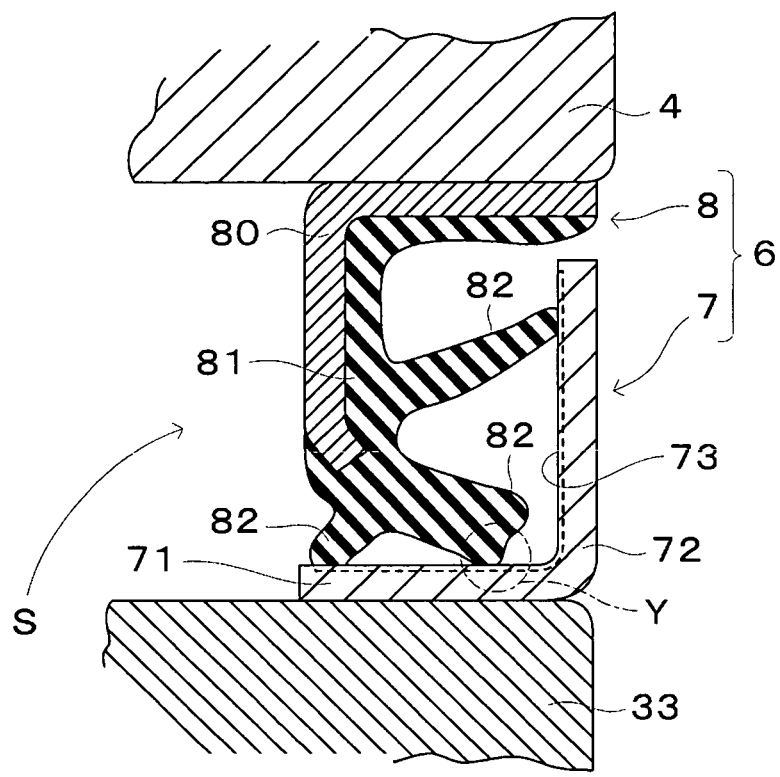
FIG. 2 is an enlarged view of the portion "X" in FIG. 1.
Figure 3:
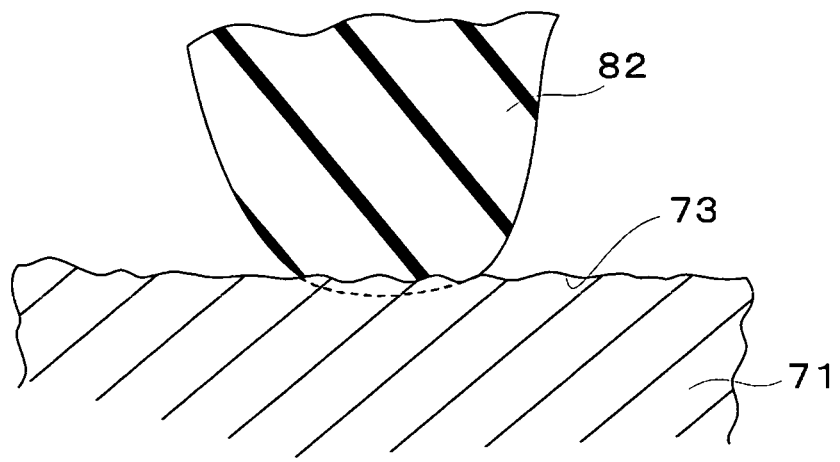
FIG. 3 is an enlarged view of the portion "Y" in FIG. 2.
Figure 4:
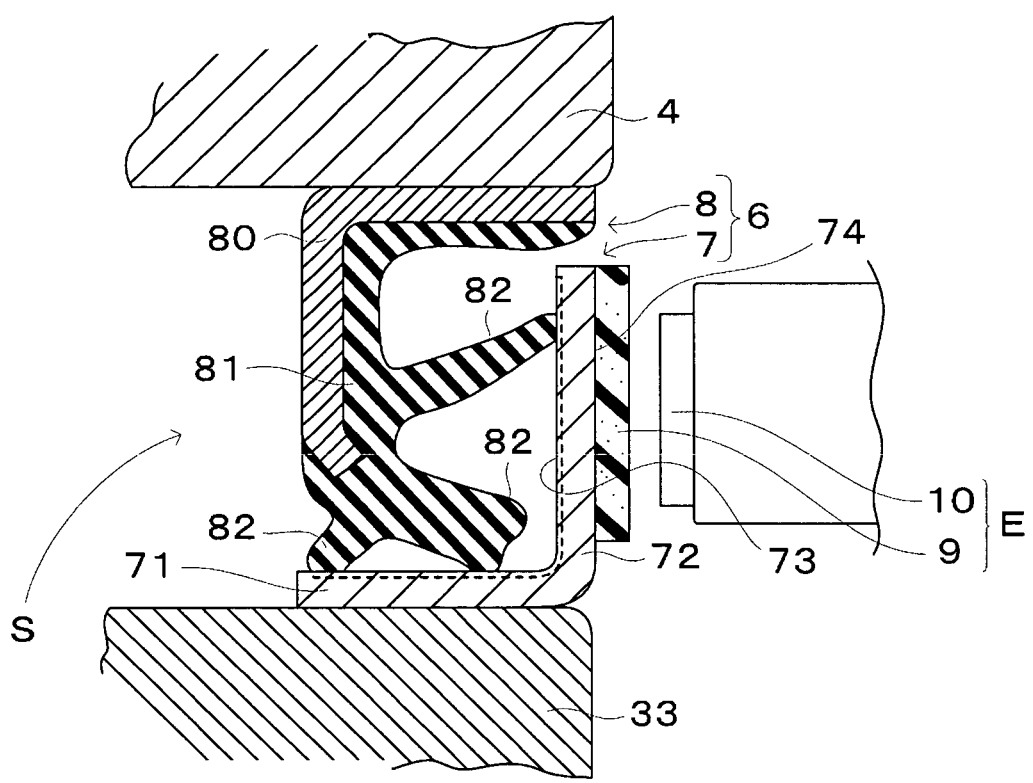
FIG. 4 shows a modified embodiment of the sealing device of the present invention and is a similar view of FIG. 2.

FIG. 1 is a longitudinal sectional view showing one embodiment in which the sealing device of the present invention is employed, FIG. 2 is an enlarged view of the portion "X" in FIG. 1, FIG. 3 is an enlarged view of the portion "Y" in FIG. 2, and FIG. 4 shows a modified embodiment of the sealing device of the present invention and is a similar view of FIG. 2.

FIG. 1 shows one embodiment of the structure which supports vehicle wheels relative to a driving shaft 2 by a ball bearing unit 1. A tire wheel (not shown) is fixed to a hub 3 constituting an inner ring with a bolt 31. The reference numeral 32 indicates a spline hole formed in the hub 3 and the driving shaft 2 is spline fitted in the spline hole 32 to be integrally fixed to the hub 3, thereby transmitting the rotary drive force of the driving shaft 2 into the tire wheel. The reference numeral 33 indicates an inner ring member, which constitutes the inner ring together with the hub 3.

The reference numeral 4 indicates an outer ring and is fixedly fitted to the vehicle suspension (not shown). Two rows of rolling elements (ball) 5 . . . are interposed while being held with a retainer 51 between the outer ring 4 and the inner ring (hub 3 and inner ring member 33). The reference numerals 6 and 6' indicate a sealing device for preventing leakage of lubricant agent (grease and the like) provided in the rolling portion of the rolling elements 5 . . . and for preventing ingress of dirt or water from outside and are inserted under pressure between the outer ring 4 and the inner ring (hub 3 and inner ring member 33).

FIG. 2 is an enlarged view of the portion "X" in FIG. 1 in which a ring-like slinger 7 obtained by sheet metal processing of stainless steel (SUS430 and the like) is fitted under pressure in the peripheral body at the inner wheel side (hub 3 and inner wheel member 33). The slinger 7 comprises a fitting cylindrical portion 71 fitted to the peripheral body of the inner wheel (hub 3 and inner wheel member 33) and a brim portion 72 radially extended at an end of the fitting cylindrical portion 71, which is opposite to a sealed portion S.

Further, a sealing member 8 made of a rubber material selected from NBR, H-NBR, ACM, AEM, FXM and the like is also fitted under pressure. The sealing member 8 comprises a core member 80 made of stainless steel, low-carbon steel and the like and a lip body 81 made of an elastic material such as rubber integrally formed with the core member 80. The lip body 81 includes a plurality of seal lips 82 . . . extending like a tongue. When the slinger 7 and the sealing member 8 are fitted and combined each other to constitute the sealing device 6, the tip ends of the seal lips 82 . . . elastically contact the surface of the slinger 7 accompanied with elastic deformation. The sealing member 8 under such condition is fitted in the peripheral body (inner peripheral surface) of the outer wheel 4.

Thus the sealing device 6 is constituted with the slinger 7 and the sealing member 8 and the face of the slinger 7 to which the seal lips 82 . . . elastically contact becomes a sealing face (hereinafter called as a slidably contacting treated surface 73) where they slidably contact each other accompanied with rotation of the inner wheel (hub 3 and inner wheel member 33), thereby preventing invasion of dirt or water into the bearing unit 1 from outside and leakage of grease and the like filled in the bearing unit 1. In the figure, three seal lips 82 are formed, however, the shape of seal lip is not limited to the embodiment in the figure. The slidably contacting treated surface 73 may be applied with grease based on synthetic hydrocarbon or mineral oil.

The slidably contacting treated surface 73 of the slinger 7 with the seal lip 82 is processed to have the following predetermined parameter (JIS B0601-1994).

The arithmetic mean roughness Ra is 0.5 μm to 1.5 μm.
The root-mean-square roughness Rq is 0.6 μm to 2.0 μm.
The mean irregularity interval Sm is 0.05 mm to 0.17 mm.
The peak count Pc (50%) is 20 to 60.

These predetermined parameters are obtained by the inventors after repeating trials and experiments executing surface treatment using several parameters. One example of the experimental result in which reduction in torque and in heat generation temperature of the seal lip is established corresponding to the parameters is explained later.

FIG. 3 diagrammatically shows the form of the slidably contacting treated surface 73 and is an enlarged view of the portion "Y" in FIG. 2.

The slidably contacting treated surface 73 formed based on the above-mentioned predetermined parameters is an uneven surface with small roughness pitch and without having edges. The surface treatment method of the slidably contacting treated surface 73 having the above-mentioned predetermined parameters is not limited, however, the slinger 7 may be formed by cutting work, and the method may be a concavo-convex transferring treatment in which a mold formed with concavity and convexity is transferred to the slinger, a wet blast treatment or a shot peening treatment.

If the error of the value A calculated by the following mathematical expression (1) and the measured value of the above-mentioned Ra satisfies the following condition (1), the torque value and the heat generation temperature can be more reduced. It is explained referring to the experimental result mentioned later.

$$A = 0.8462Rq - 0.5078Sm - 0.0012Pc + 0.0516 \quad \text{Mathematical formula (1)}$$

Condition (1):
As to the error of the calculated value A and the measured value of Ra, $(A-Ra)/Ra \times 100(\%)$, the distribution of the above-mentioned error obtained by measuring in random directions is within ±7%, statistically viewing 3σ.

In order to satisfy the above condition (1), the diameter of minute solid particle is adjusted or the shooting speed is controlled in a shot peening treatment in which minute solid particles are hit, thereby forming the slidably contacting treated surface 73 which satisfies the condition. A steel ball having a diameter of 40 to 200 μm is used as the minute solid particle and when it is shot to be hit on the slidably contacting treated surface 73 at more than a shooting speed of 100 m/sec, the slidably contacting treated surface 73 with a desirable roughness can be formed. Minute solid particles made of metal, glass or ceramic may be used.

The present invention is not limited to be applied to the bearing unit 1 shown in the figure, but it goes without saying that it may be applicable to the bearing mechanism in which the inner wheel is fixed or the outer wheel is fixed.

Now explained is FIG. 4 which shows a modified embodiment of the sealing device of the present invention and is a similar view of FIG. 2. The same reference numeral is allotted to the common member of the above-mentioned embodiment and its explanation is omitted.

According to the sealing device 6 shown in the figure, a tone wheel 9 on which a plurality of N poles and S poles are alternately formed along the circumferential direction is integrally attached on a face 74 (namely the face opposite to the sealing portion S) opposite to the slidably contacting treated surface 73 of the brim portion 72 of the slinger 7.

A magnetic sensor 10 is fixedly provided for the outer wheel 4 or the stationary side member of the vehicle body and it constitutes a magnetic encoder E together with the tone wheel 9 for detecting the rotary speed of the wheel. The tone wheel 9 is made of a magnetic rubber sheet in which magnetic powder such as ferrite or rare earth is mixed in advance with a rubber material selected from NBR, H-NBR, ACM, AEM, FKM and the like and is magnetized by arranging a plurality of N poles and S poles alternately in the circumferential direction. The tone wheel 9 may not be limited to be made of a magnetic rubber, but may be a plastic magnet or a sintered magnet.

The tone wheel 9 is fixedly attached to the side 74 opposite to the slidably contacting treated surface 73 of the brim portion 72 of the slinger 7 with adhesive. The adhesive is preferably an epoxy-based adhesive, however, it may be an elastic adhesive such as sealant or elastomeric adhesive.

The slidably contacting treated surface 73 of the slinger 7 is finished to have the predetermined parameter like the above-mentioned embodiment. The surface treatment is executed after the tone wheel 9 is bonded to the slinger 7, namely it is executed on the adhesive layer bonded with the adhesive.

In this case, even when the tone wheel 9 is attached after the slinger 7 is entirely dipped in the adhesive, the slidably contacting treated surface 73 with surface treatment is not affected by the adhesive layer, since the adhesive does not remain on the slidably contacting surface which has been processed with the surface treatment, so that the friction resistance of the slidably contacting treated surface 73 can be reduced. Therefore, the rotary torque can be reduced while realizing the sealing ability and the fuel-efficiency of the vehicle.

The above-mentioned surface treatment may be executed such that the slinger 7 is entirely dipped in the adhesive to form an adhesive layer and thereafter the area other than the slidably contacting treated surface 73 which is rendered to surface treatment is masked and the surface treatment is processed on the slidably contacting treated surface 73, the masking is removed and then the tone wheel 9 is integrally attached to the slinger 7.

Also in this case, since the adhesive does not remain on the slidably contacting surface which has been processed with a surface treatment, the friction residence of the slidably contacting surface is reduced and the rotary torque can be reduced while realizing the sealing ability and fuel-efficiency of the vehicle, and the slidably contacting treated surface 73 is not affected by the adhesive layer formed by the adhesive applied on the entire slinger 7 and the surface treatment is executed on the slidably contacted treated surface 73, thereby reducing the friction resistance of the slidably contacting treated surface 73. Therefore, also in this case, the rotary torque can be reduced while keeping the sealing ability and the fuel-efficiency of the vehicle.

The procedure of surface treatment on the slidably contacting treated surface 73 of the slinger 7 is not limited to the above-mentioned embodiment in which the slidably contacting treated surface 73 is processed with surface treatment, then the area other than the slidably contacting treated surface 73, namely only the face to be attached to the tone wheel 9, is applied with adhesive and the tone wheel 9 is bonded to the slinger 7. However, it is required that the slidably contacting treated surface 73 with surface treatment is processed in the order to satisfy the predetermined parameter condition without being affected by the adhesive layer.

Next, the experimental example which establishes that the torque reduction and the heat generation temperature reduction of the seal lip can be achieved with the above-mentioned predetermined parameter is explained referring to the drawings.

Figure 6:
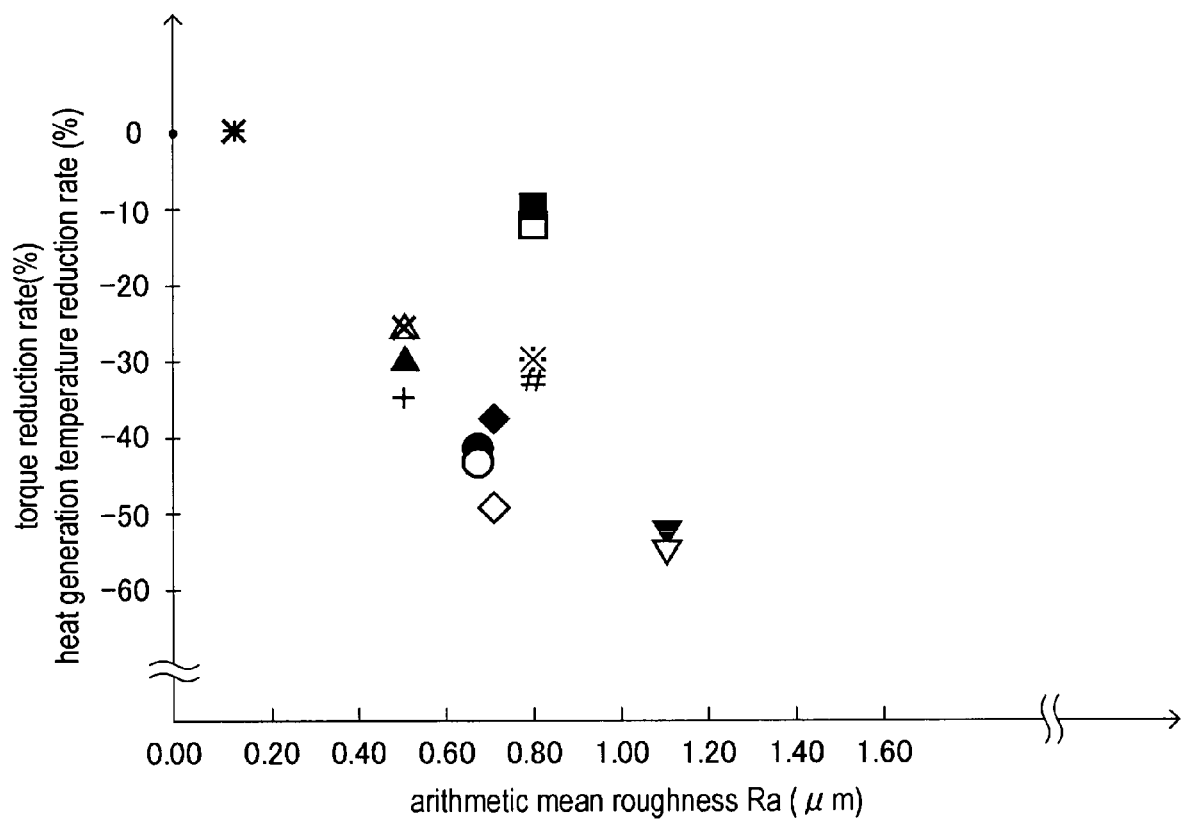
FIG. 6 is a graph representation of the experimental result of FIG. 5.
Figure 7A:
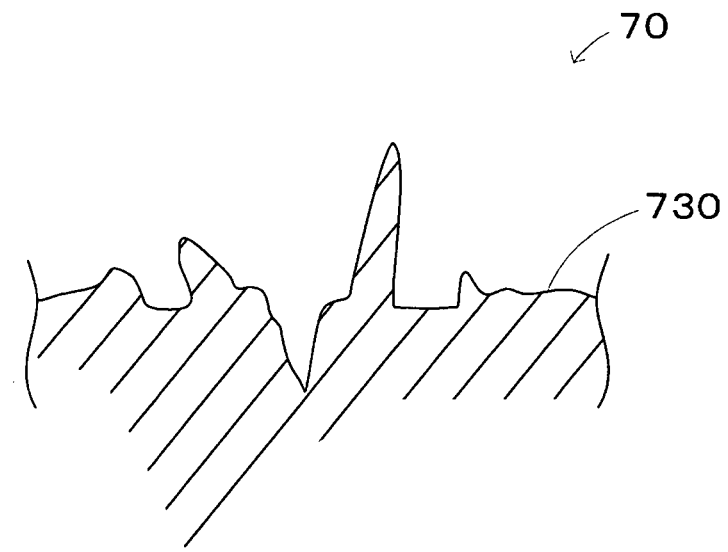
FIG. 7a and FIG. 7b are a partial sectional view diagrammatically showing the slidably contacting surface of the slinger of the prior sealing device.
Figure 7B:
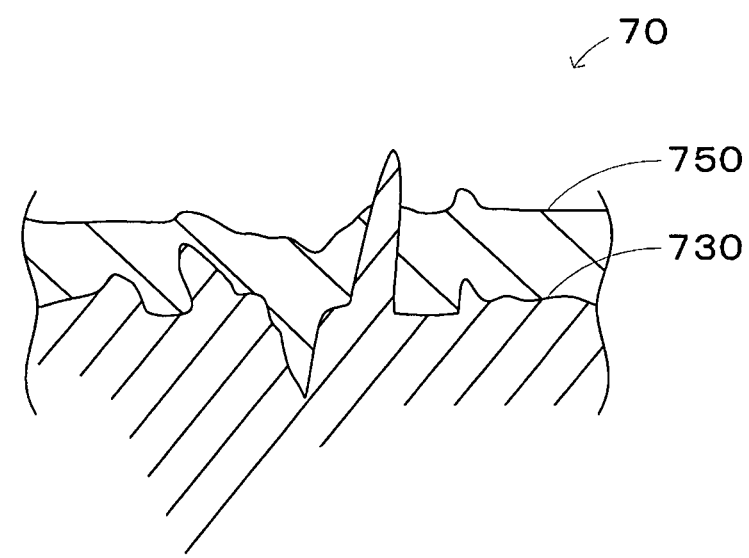

FIG. 5 shows a table of the experimental result of the measured value, the calculated value and the reduction rate according to experiments and FIG. 6 is a graph representation of the experimental result of FIG. 5.

(Experimental Example)

Slingers of sample A to sample H were prepared using metal material of SUS 430.

Sample A was a slinger without surface treatment and was made of rolled plate. Sample B was a slinger formed by cutting the above-mentioned metal material. Sample C was a slinger made of the above-mentioned metal material and the slidably contacting treated surface with the seal lip was processed with the above-mentioned concavity and convexity transferring treatment. Sample D to sample H were slingers of which slidably contacting treated surfaces with the seal lip were executed with a shot peening treatment. The shot peening treatment for the sample D to the sample H was executed such that minute solid particles of steel ball having a diameter of 40 to 200 μm were shot and hit at a speed more than 100 m/sec as mentioned above and the treated surface was cleaned with a cleaning water to remove the minute solid particles.

These 8 samples were checked with a rotary torque measuring instrument and the rotary torque was measured at the rotation number of 500 rpm, the seal lip slidably contacted with the slidably contacting treated surface and the heat generation temperature of the seal lip was measured. The experimental temperature was room air temperature. As to the surface roughness of the slidably contacting treated surface of the sample A to sample H with the seal lip, the parameter of the surface roughness was measured based on JIS B0601-1994. In FIG. 5, the reference numeral Ra (μm) indicates arithmetic mean roughness, Rq (μm) is root-mean-square roughness, Sm (mm) is mean irregularity interval and Pc (50%) is the peak count.

(Result)

FIG. 5 and FIG. 6 show the result of the above-mentioned experimental. FIG. 5 shows the surface treatment condition of the slidably contacting treated surface, each parameter of surface roughness of the slidably contacting treated surface, the error obtained by the calculated value A by the mathematical expression (1) and the measured value Ra, the torque reduction rate, and the reduction rate of heat generation temperature obtained by the experimental result, for the above-mentioned eight slingers. The error shown in the table of FIG. 5 is the one calculated from the data in case of the measurement number n=50 in which the slidably contacting treated surfaces of the sample A to sample H are measured in random directions and statistically shows the error within the range of ±3σ:99.8%. The reduction rate of torque and the heat generation temperature reduction rate show the rate, being the sample A as a standard, respectively.

According to the sample A, the measured value Rq (μm) and Pc (50%) are out of the numeric range of the above-mentioned parameter and any surface treatment is not done. As shown in the experimental result, the torque reduction rate and the heat generation temperature reduction rate of the sample B to sample H are lowered from those of the sample A being a standard. When the error (%) of the sample A is calculated, it is −132.5% to 136.4% in the range of ±3σ: 99.8% and largely exceeds the range of ±7% in the condition (1).

The sample B is surface treated by cutting work to satisfy the numeric range of the above-mentioned predetermined parameter. It is understood from the experimental result that the sample which satisfies the above-mentioned predetermined parameter and is surface treated shows superior performance in the reduction of the torque and the heat generation temperature of the seal lip.

The sample C is surface treated by concavity and convexity transferring treatment to satisfy the numerical range of the above-mentioned predetermined parameter. It is understood from the experimental result that the sample which satisfies the above-mentioned predetermined parameter and is surface treated shows superior performance in the reduction of the torque and the heat generation temperature of the seal lip.

The next samples D to H are rendered with roughening treatment by shot peening to satisfy the numeric range of the above-mentioned parameter and satisfy the above-mentioned condition (1). It is understood from the experimental result that they show superior performance that the torque reduction rate of the samples D to H is −27% to −55% and the reduction rate of the heat generation temperature of the seal lip is −27% to −53%. Therefore, it can be said that when the slidably contacting treated surface is processed so as to satisfy the condition (1) in addition to the above-mentioned predetermined parameter, the torque can be stably reduced. In addition, the resistance level of the seal lip can be checked by measuring the heat generation temperature of the seal lip. Therefore, it can be said that the resistance applied on the seal lip is small if the heat generation temperature is reduced and the sealing member achieves a longer operation life according to the sample B to sample H.

FIG. 6 is a graph showing the relation of the reduction rate of the torque, the reduction rate of the heat generation temperature of the seal lip and the arithmetic mean roughness Ra based on the experimental result of FIG. 5. The vertical axis of the graph of FIG. 6 shows the reduction rate of toque and the reduction rate of heat generation temperature of the seal lip and the horizontal axis shows the measured arithmetic mean roughness Ra (μm).

It is understood from the graph that the torque and the heat generation temperature of the seal lip of the sample A are not reduced compared to the sample B to sample H which are surface treated and the sample B to sample H show superior performance in reduction of the torque and the heat generation temperature of the seal lip.

As mentioned above, it is found that when the slidably contacting treated surface of the slinger is treated so as to satisfy the above-mentioned predetermined parameter, the torque and the heat generation temperature of the seal lip can be reduced. In addition, when the above-mentioned condition (1) is satisfied, the above-mentioned reduction effect can be achieved more effectively and stably.

The invention claimed is:

1. A sealing device for a sealing space between two members concentrically and relatively rotating in which the one member is a stationary side member and the other member is a rotary side member, which comprises:
   a core member fixedly fitted into one of said two members;
   a metal slinger fixedly fitted into the other of said two members; and
   an elastic seal member fixedly attached to said core member and having a seal lip which elastically and slidably contacts said slinger, said slinger having a slidably contacting surface for said seal lip, and comprising a fitting cylindrical portion to be fitted into said rotary side member and a brim portion extended in the radial direction of said slinger from an end of the outer side relative to a part of said fitting cylindrical portion to be sealed, and to the opposite side of said slidably contacting surface of said brim portion a tone wheel magnetized by a plurality of N poles and S poles being integrally attached by an adhesive agent, in such a manner that N pole and S pole are alternately formed along its circumferential direction, wherein:

said slidably contacting surface is processed with a surface treatment as defined by all the following parameters: arithmetic mean roughness Ra in the range from. 0.51 μm to 1.51 μm, root-mean-square roughness Rq in the range from 0.61 μm to 2.01 μm, mean surface irregularity interval Sm in the range from 0.05 mm to 0.17 mm, and peak count Pc (50%) in the range from 20 to 60;

said slidably contacting surface is processed with said surface treatment after said adhesive agent is applied on the whole surface of said slinger, and said adhesive agent remains on the part of said slinger excluding the part where said surface treatment has been made; and said slidably contacting surface is defined as such surface in which the error between the value A calculated by the following mathematical expression (1) and the measured value of said value Ra meets the following condition (1) mathematical expression (1): A=0.8462Rq−0.5078Sm−0.0012Pc+0.0516 condition (1): herein as for the error between the calculated value A and said measured value of (A−Ra)/Ra×100%, the distribution of said error obtained by measuring in random directions is within ±7%, when statistically viewing 3σ.

2. The sealing device as set forth in claim 1, wherein:
said slidably contacting surface is processed with said surface treatment, after said tone wheel is attached to said slinger.

3. The sealing device as set forth in claim 1, wherein:
an adhesive is applied on the whole surface of said slinger including said slidably contacting surface, then said slidably contacting surface is processed with said surface treatment with said other surface of said slinger except said slidably contacting surface masked with a masking measure, then said tone wheel is attached to said slinger after releasing said masking.

4. The sealing device as set forth in claim 1, wherein:
said slidably contacting surface is processed with said surface treatment which is carried out by shooting abrasive particles onto said slinger in the range from 40 to 200 μm in diameter at 100 m/sec or over.

* * * * *